March 5, 1968  R. L. HAXBY  3,371,741
GEOPHYSICAL EXPLORATION INSTRUMENT SUPPORT
Filed Oct. 5, 1966  2 Sheets-Sheet 1
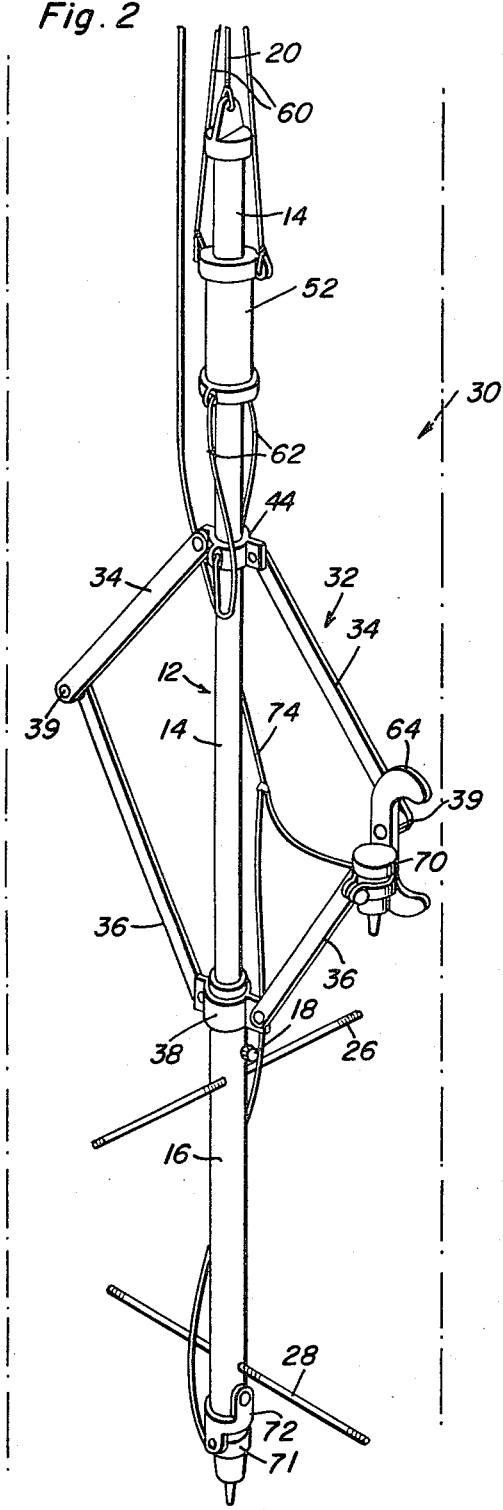
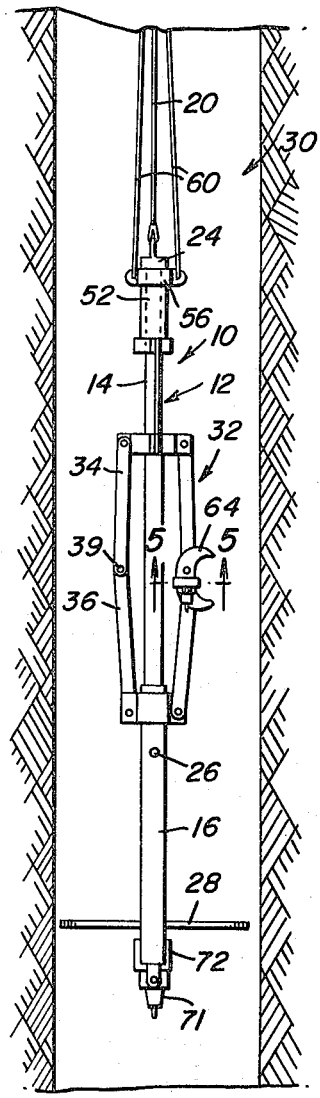
Ronald L. Haxby
INVENTOR.
BY *Clarence A. O'Brien*
*and Harvey B. Jacobson*
Attorneys March 5, 1968   R. L. HAXBY   3,371,741
GEOPHYSICAL EXPLORATION INSTRUMENT SUPPORT
Filed Oct. 5, 1966   2 Sheets-Sheet 2
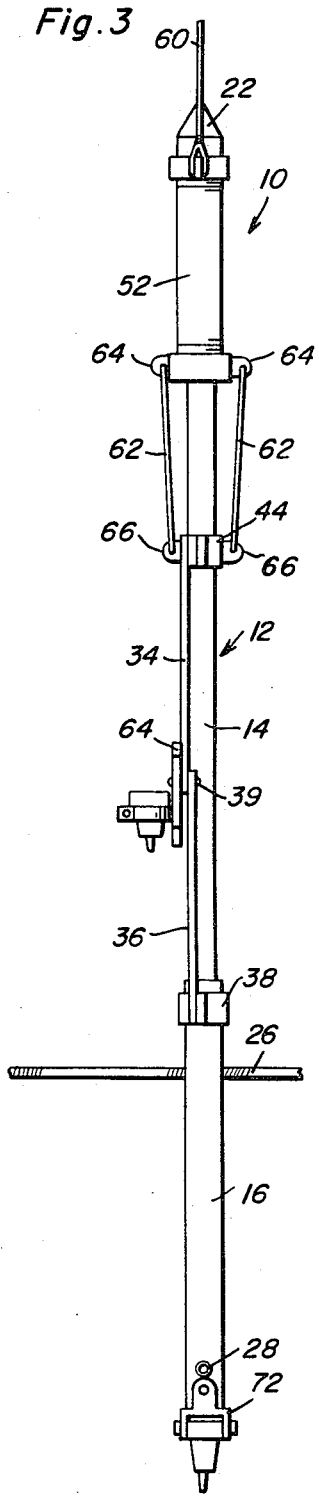
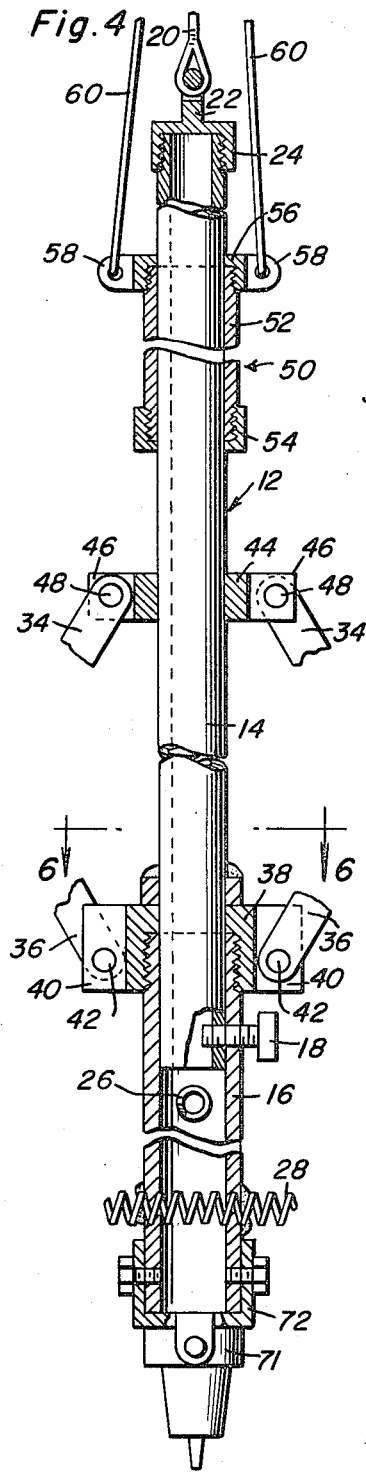
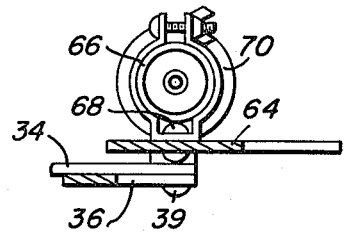
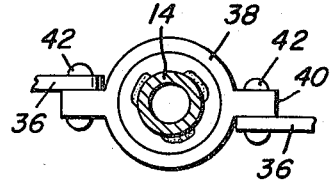
Ronald L. Haxby
INVENTOR.
BY Clarence A. O'Brien
and Harvey B. Jacobson
Attorneys

United States Patent Office 3,371,741
Patented Mar. 5, 1968

3,371,741
GEOPHYSICAL EXPLORATION
INSTRUMENT SUPPORT
Ronald L. Haxby, Tucson, Ariz.
(1421 Oxford Road, Maitland, Fla. 32751)
Filed Oct. 5, 1966, Ser. No. 584,529
7 Claims. (Cl. 181—.5)

The present invention relates to an instrument support and more particularly a support adapted to position geophysical exploration instruments and the like in a bore hole, shaft or the like. More specifically, the present invention relates to a novel geophone positioning frame.

Devices have been proposed heretofore for the positioning of compressional wave sensing devices and the like, such as geophysical vibration transducers or geophones, commonly used for seismic surveys. It will be appreciated that in the course of a rock mechanics research project it is often necessary to place geophones within or at the bottom of a blast hole to detect seismic waves from the surface. However, the conventional devices available for the placement of geophones under such circumstances was heretofore somewhat less than satisfactory.

A need therefore exists for a positioning frame for supporting geophysical exploration instruments and the like while they are at the bottom of or at an intermediate depth in a bore hole, shaft or the like so as to permit quick, positive placement and retrieval of instruments such as vibration transducers, for example.

It is therefore a primary object of the present invention to provide a novel positioning frame for supporting geophysical exploration instruments and the like in a bore hole which device includes a radially expansible anchor means selectively controllable from above ground to positively position the device at a predetermined depth in a bore hole and retrieve the device.

Another object of the present invention is to provide a positioning frame for supporting geophysical exploration instruments and the like in a bore hole which device is suitable for use in both vertical and inclined bore holes.

Still another object of the present invention is to provide a novel positioning frame for supporting geophysical exploration instruments and the like in a bore hole which device may selectively be supported by flexible members such as a wire, rope or a rigid member such as a drill string for example.

Still another object of the present invention is to provide a novel positioning frame for geophysical exploration instruments and the like which includes an anchoring means comprising articulated radially expansible anchoring arms which may be selectively expanded from above ground so as to selectively position the device at a predetermined depth within a bore hole.

Still another object of the present invention is to provide a positioning frame for supporting geophysical exploration instruments for measuring seismic differences in pit benches.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of an exemplary embodiment of a positioning frame for supporting geophysical exploration instruments and the like constructed in accordance with the present invention wherein the device is shown in the normal configuration of the device during travel in or out of a bore hole or shaft;

FIGURE 2 is an enlarged perspective view of the device of FIGURE 1 further showing the configuration of the anchoring means when the device is selectively secured at a desired depth within a bore hole, which bore hole is shown in phantom lines;

FIGURE 3 is an enlarged side elevational view of the device of FIGURE 1;

FIGURE 4 is a fragmentary enlarged elevational view of the device of FIGURE 1 with portions shown in vertical section;

FIGURE 5 is an enlarged fragmentary bottom plan view of a geophone connected to the device of FIGURE 1 as taken along the plane of line 5—5 of FIGURE 1; and FIGURE 6 is a horizontal sectional view of a portion of the anchoring means of the device of FIGURE 1 taken substantially along the plane of line 6—6 of FIGURE 4.

Referring now to the drawings it will be seen that the geophysical exploration instrument frame or support indicated generally at 10 includes an elongated mandrel indicated generally at 12 which in the exemplary embodiment illustrated includes an upper mandrel portion 14 and a lower mandrel portion 16 releasably connected such as by a through bolt 18, for example, threadably received in suitable threaded apertures in the mandrel portions 14 and 16. The mandrel 12 is suspended from above ground by a stop rope, wire cable or the like 20 secured to a cable eye 22 forming an integral part of an end cap 24 threadably received on the upper end of the mandrel portion 14.

Adjacent the lower end of the lower mandrel portion 16 there are preferably provided resilient elements 26 and 28, such as formed of relatively rigid yet resilient helically wound springs for example, which resilient 26 elements and 28 cooperate, as seen best in FIGURES 1 and 2, to maintain the instrument support 10 in a generally central position within the bore hole which is indicated generally at 30. As seen best in FIGURE 1 the resilient guide members 26 and 28 are preferably sized so as to be of a slightly lesser length than the diameter of the bore hole 30 within which the instrument support 10 is being utilized so as to guide but not impede the travel of the support 10 in and out of the bore hole as the mandrel 12 is moved up and down the bore hole by means of the stop rope or cable 20. While not shown it will be appreciated that the instrument support 10 instead of being supported from above ground by the stop cable 20 may also be supported from the bottom of a pipe string. It will be appreciated that such an arrangement may be desirable or necessary when utilizing the instrument support 10 of the present invention in a bore hole which traverses the earth in other than a substantially vertical direction.

The instrument support device 10 further includes a radially expansible anchor means indicated generally at 32 which is operatively carried by the mandrel 12. The expansible anchor means 32 in the preferred embodiment illustrated, includes two pairs of anchor arms 34 and 36 articulated at 39 by means of a suitable pin, bolt or the like. The lower anchor arms 36 are pivotally secured relative to the mandrel 12 by means of a collar 38 threadably received upon an upper portion of the lower mandrel portion 16 so as to be fixed with respect thereto. The collar 38 is provided with a pair of integral opposed apertured ears 40 to which are pivotally secured the lower anchor arms 36 by means of suitable pins, bolts or the like 42.

The upper articulated anchor arms 34 of the radially expansible anchor means 32 are slidably supported relative to the upper mandrel portion 14 of the mandrel 12 y means of an upper anvil collar 44 sized so as to be freely slidable along the upper mandrel portion 14. The anvil collar 44 is provided with a pair of opposed apertured ears 46 to which are pivotally secured the upper articulated anchor arm 34 by means of pivot pins or bolts 48 in a manner somewhat analogous to the mounting of the lower arms 36. Although not shown, it will be nevertheless appreciated that the provision of two pairs of articulated arms 34 and 36 respectively is merely exemplary and that any suitable number of arms could be utilized in constructing the radially expansible anchor means 32. As seen best in FIGURES 2 and 4, the instrument support 10 further includes an anchor arm actuating means indicated generally at 50 which actuating means includes a hammer pipe 52 sized so as to be freely slidable along the upper mandrel portion 14 of the mandrel 12. As best seen in FIGURE 4 the hammer pipe 52 is preferably provided with a threadably received or otherwise secured lower end cap 54 of an annular configuration while the upper end of the hammer pipe 52 is provided with an annular end cap 56 provided with a pair of opposed apertured ears 58 to which is secured a tow rope 60. The tow rope 60 extends above ground so as to facilitate selective reciprocation of the anchor arm actuating means 50, which means also includes a pair of flexible hammer travel limit cables 62 anchored as at 64 to the lower end cap 54 of the hammer pipe 52 and anchored as at 66 to the anvil collar 44.

In the instrument support embodiment 10 illustrated it will be noted that there is provided a bore hole wall contact means comprising a contact plate 64 preferably although not necessarily of a C-shaped configuration so as to provide multiple contact points at the outer ends thereof. The contact plate 64 is pivotally secured to the anchor means 32 at the point of articulation of the arms 34 and 36 by the means of the pivot bolt 39 pivotally securing the arms 34 and 36. As seen best in FIGURE 5 a band clamp 46 is secured to the contact plate 64 by means of a bolt, rivet or the like 68 within which clamp 66 is releasably secured a geophone or other suitable geophysical instrument 70. In the embodiment illustrated a second geophysical phone 71 is pivotally secured to the lower end of the mandrel portion 16 by means of a universal-type connector 72. The geophones 70 and 71 are electrically connected in a suitable manner to associated apparatus above ground by means of a wire harness 74.

Referring now to the operation of the geophysical exploration instrument support 10 it will be seen that in FIGURE 1 as the device 10 supported by the stop cable 20 is lowered into the bore hole 30 the resilient guide members 26 and 28 will maintain the support 10 centrally disposed in the bore hole 30. It will further be noted that by maintaining adequate tension on the tow rope 60 the hammer pipe 52 of the anchor arm actuating means 50 will be moved upwardly along the mandrel 14 thus tensioning the flexible cables 62 connecting the hammer pipe 52 to the anvil collar 44. It will thus be appreciated that the anvil collar 44 will be maintained in elevated position so as to maintain the articulated arms 34 and 36 in a contracted or straightline position to facilitate transporting the instrument support 10 into the bore hole 30. As seen in FIGURE 1 the end cap 24 also assists in limiting the travel of the hammer pipe 52 by virtue of the fact that the annular end cap 56 abuts thereagainst.

As seen in FIGURE 2, the radially expansible anchor means 32 of the instrument support 10 is shown in expanded position wherein it is in locking engagement with the wall of the bore hole 30. This is accomplished by arresting travel of the stop rope 20 when the instrument support 10 has reached a predetermined depth, which depth may of course be at the bottom of the bore hole or at some intermediate depth in the bore hole, after which the tension on the tow rope 60 is released thereby also releasing the tension on the flexible cables 62 permitting the anvil collar 44 to descend on the mandrel 14 thus radially expanding the arms 34 and 36 as they pivot about their associated upper and lower and intermediate pivot points. Thus, the radially expansible anchor means begins to engage the wall of the bore hole 30. The tow rope 60 is then reciprocated a sufficient distance to permit impacting the end cap 54 of the hammer pipe 52 against the anvil collar 44 so as to drive the contact plate 64 into positive engagement with the wall of the bore hole 30 by further radial expansion of the anchor means 32 thereby setting the instrument support 10 thus readying the geophones 70 and 71 mounted on the support 10 for the reception of seismic vibrations.

To recover the instrument support 10 from within the bore hole 30 it is merely necessary to tension the tow rope 60 sufficiently to also tension the flexible cables 62 thus drawing the hammer pipe 52 and the anvil collar 44 upwardly along the mandrel 14 so as to radially contract the expansible anchor means 32 from the position shown in FIGURE 2 back to the position shown in FIGURE 1 wherein the device may be withdrawn from the bore hole 30 by means of the stop rope 20.

Although in the embodiment illustrated the radially extensible anchor means 32 is operated by tensioning the flexible cables 62 of the anchor arm actuating means 50 it will nevertheless be appreciated that the anvil collar 44 of the radially extensible anchor means 32 may be reciprocated by a power operated device such as an electrical, pneumatic, hydraulic motor, not shown, operatively connected in a suitable manner so as to reciprocate the anvil collar 44 along the mandrel 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A positioning frame for supporting geophysical exploration instruments and the like in a bore hole comprising a mandrel adapted to be supported from above ground, a radially expansible anchor means carried by said mandrel, said anchor means including a plurality of articulated anchor arms, means pivotally securing one end of each articulated anchor arm to said mandrel, collar means carried by said mandrel for pivotally and slidably securing the other end of each of said arms to said mandrel whereby longitudinal sliding movement of said collar means along said mandrel radially expands and contracts said anchor means into and out of stabilizing contact with the bore hole wall, and anchor arm actuating means slidably carried by said mandrel and adapted to be operated from above ground to selectively expand or contract said radially expansible anchor means.

2. The combination of claim 1 wherein said articulated arms comprise first and second pivotally connected arms.

3. The combination of claim 2 including a bore hole wall contact plate pivotally connected to said arms at their point of articulation.

4. The combination of claim 1 wherein said plurality of articulated anchor arms are mounted upwardly of the bottom end of said mandrel and said mandrel is provided with a transversely extending resilient guide means carried by said mandrel below said anchor arms so as to maintain said mandrel in a centrally disposed position in the bore hole during a trip in and out of a bore hole.

5. The combination of claim 1 wherein said collar means and said arm actuating means are connected by a flexible connector means whereby said actuating means may be permitted to impact against said collar when moved in a first direction and only permitted to move a predetermined distance away from said collar when moved in the opposite direction.

6. The combination of claim 5 wherein geophones are secured to one of said anchor arms and the bottom end of said mandrel.

7. The combination of claim 5 including a stop means carried by said mandrel to limit the upward travel of said arm actuating means.

References Cited
UNITED STATES PATENTS

| | | | |
|---|---|---|---|
| 1,875,583 | 9/1932 | Fox | 102—21.8 X |
| 2,428,168 | 9/1947 | Loper | 340—18 |
| 3,231,041 | 1/1966 | Kokesh | 181—.5 |
| 3,323,612 | 6/1967 | Patterson et al. | 181—.5 |

FOREIGN PATENTS

| | | |
|---|---|---|
| 502,546 | 7/1930 | Germany. |
| 1,169,871 | 1/1959 | France. |
| 1,213,369 | 3/1966 | Germany. |

BENJAMIN A. BORCHELT, *Primary Examiner.*

R. M. SKOLNIK, *Assistant Examiner.*